(12) United States Patent
Wei et al.

(10) Patent No.: US 10,040,370 B2
(45) Date of Patent: Aug. 7, 2018

(54) CONTAINER COMPRISING A BATTERY, TRANSPORTATION SYSTEM COMPRISING THE SAME AND METHOD THEREOF

(71) Applicants: Ningbo Wise Digital Technology Co., Ltd, Ningbo (CN); Xibo Wei, Ningbo (CN); Yuanyuan Li, San Jose, CA (US)

(72) Inventors: Xibo Wei, Ningbo (CN); Yuanyuan Li, San Jose, CA (US); Jingjing Wei, Ningbo (CN)

(73) Assignee: Ningbo Wise Digital Technology Co., Ltd, Ningbo (CN)

( * ) Notice: Subject to any disclaimer, the term of this patent is extended or adjusted under 35 U.S.C. 154(b) by 95 days.

(21) Appl. No.: 15/268,702

(22) Filed: Sep. 19, 2016

(65) Prior Publication Data

US 2018/0105063 A1 Apr. 19, 2018

Related U.S. Application Data

(60) Provisional application No. 62/221,008, filed on Sep. 19, 2015.

(51) Int. Cl.
| | |
|---|---|
| *B60L 11/18* | (2006.01) |
| *B64C 39/02* | (2006.01) |
| *B64D 27/24* | (2006.01) |
| *H02J 7/00* | (2006.01) |
| *H01M 10/04* | (2006.01) |
| *H01M 10/42* | (2006.01) |
| *G06Q 10/08* | (2012.01) |

(52) U.S. Cl.
CPC ....... *B60L 11/1879* (2013.01); *B60L 11/1877* (2013.01); *B64C 39/024* (2013.01); *B64D 27/24* (2013.01); *H01M 10/04* (2013.01); *H01M 10/425* (2013.01); *H02J 7/0042* (2013.01); *H02J 7/0063* (2013.01); *B60L 2200/10* (2013.01); *B64C 2201/042* (2013.01); *B64C 2201/128* (2013.01); *G06Q 10/0833* (2013.01); *H01M 2010/4271* (2013.01); *H01M 2220/20* (2013.01)

(58) Field of Classification Search
CPC ............ B64C 39/024; B64C 2201/042; B64C 2201/128; B64D 27/24; B60L 11/879; B60L 2200/10
See application file for complete search history.

(56) References Cited

U.S. PATENT DOCUMENTS 5,559,420 A * 9/1996 Kohchi ..................... B60K 1/04
180/65.1
7,795,837 B1 * 9/2010 Haun ................... H01M 10/441
136/244

(Continued)

*Primary Examiner* — Christopher P Ellis
(74) *Attorney, Agent, or Firm* — Guosheng Wang; United States Research and Patent Firm

(57) ABSTRACT

The present invention provides a container, a transportation system comprising such a container, and a method of using the transportation system. The container includes a battery that provides electricity to a vehicle such as an unmanned aerial vehicle that is carrying and shipping the container. The battery functions as a supplemental power supply to the vehicle and hence improves the endurance of the vehicle, so that heavier cargo can be shipped over longer distance.

19 Claims, 18 Drawing Sheets

(56) References Cited

U.S. PATENT DOCUMENTS

| | | | | |
|---|---|---|---|---|
| 8,627,908 B2* | 1/2014 | Wellborn | B62D 59/04 | 180/14.2 |
| 9,280,038 B1* | 3/2016 | Pan | G03B 17/561 | |
| 9,321,531 B1* | 4/2016 | Takayama | B64D 1/12 | |
| 9,685,682 B2* | 6/2017 | Hoshi | H01M 10/4207 | |
| 9,887,570 B2* | 2/2018 | Johnsen | H02J 7/0065 | |
| 2010/0025132 A1* | 2/2010 | Hill | B60K 1/04 | 180/65.29 |
| 2010/0065344 A1* | 3/2010 | Collings, III | B60K 6/46 | 180/2.1 |
| 2010/0141201 A1* | 6/2010 | Littrell | H02J 7/35 | 320/101 |
| 2011/0084162 A1* | 4/2011 | Goossen | B64C 39/024 | 244/12.1 |
| 2014/0375272 A1* | 12/2014 | Johnsen | B60L 1/006 | 320/136 |
| 2015/0041598 A1* | 2/2015 | Nugent | H02J 17/00 | 244/53 R |
| 2015/0102154 A1* | 4/2015 | Duncan | B64C 39/022 | 244/2 |
| 2016/0122017 A1* | 5/2016 | Welker | B64C 39/024 | 244/17.23 |
| 2016/0144734 A1* | 5/2016 | Wang | B60L 11/1822 | 701/17 |
| 2016/0157653 A1* | 6/2016 | Manitta | A47G 29/1209 | 232/27 |
| 2017/0050533 A1* | 2/2017 | Wei | B60L 11/1879 | |
| 2017/0288282 A1* | 10/2017 | Thramann | B60L 11/1822 | |
| 2017/0341499 A1* | 11/2017 | Marchisseau | B60K 1/04 | |
| 2017/0349039 A1* | 12/2017 | Rayner | B60K 1/04 | |
| 2017/0368959 A1* | 12/2017 | Hara | B60L 11/1879 | |
| 2018/0002015 A1* | 1/2018 | McCullough | B64C 29/02 | |
| 2018/0006283 A1* | 1/2018 | Hill | B60W 10/24 | |
| 2018/0013106 A1* | 1/2018 | Kano | B60L 11/007 | |
| 2018/0019458 A1* | 1/2018 | Kagami | B60L 1/08 | |

* cited by examiner

20a

20b (A)

(B)

CONTAINER COMPRISING A BATTERY, TRANSPORTATION SYSTEM COMPRISING THE SAME AND METHOD THEREOF

CROSS-REFERENCE TO RELATED U.S. APPLICATIONS

The application claims benefit of U.S. Provisional Application No. 62/221,008, filed on Sep. 19, 2015, entitled Multifunctional Power Transport Box for Unmanned Aerial Vehicle, the entire disclosure of which is incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a container, a transportation system comprising such a container, and a method of using the transportation system. More particularly, the container includes a battery that provides electricity to a vehicle carrying the container. The battery functions as a supplemental power supply to the vehicle and hence improves the endurance of the vehicle in transporting the cargo in the container. Although the disclosure will use an unmanned aerial vehicle (UAV) such as a rotorcraft as a representative example, it should be appreciated that the present invention may find applications with other vehicles such as an aircraft, a spacecraft, a watercraft including sub-surface watercraft, and a land vehicle e.g. an electrical car or truck.

BACKGROUND OF THE INVENTION

Freight transport is the physical process of transporting commodities, merchandise goods and cargo using various vehicles. For example, air freight transports cargo in specialized cargo aircraft and in the luggage compartments of passenger aircraft. Recently, people attempt to use smaller electrical aircraft to rapidly deliver parcels and packages to millions of customer's households. The most promising aircraft is Unmanned Aerial Vehicles (UAVs), which are unpiloted aircraft that are either controlled remotely or flown autonomously along pre-programmed flight plans. UAVs are commonly categorized based on their design and performance specifications spanning a range from miniature low altitude aircraft through large High Altitude Long Endurance (HALE) vehicles. Small low altitude UAVs (AKA drones) is preferred for civil delivery system.

However, there are still some challenges posed in the design, manufacturing, and operation of the UAVs. One of such challenges is the flight endurance of UAVs. In aviation, endurance is the maximum length of time that an aircraft can spend in cruising flight. Endurance is different from range, which is a measure of distance flown. For example, a typical sailplane exhibits high endurance characteristics but poor range characteristics.

Even if powerful batteries such as lithium ion battery are used for the UAVs, they may not provide enough power for the aircraft to haul heavier packages over longer period of time. As a result, the payload capability of delivery UAVs is severely limited to lighter packages within shorter distance. Lacking of payload/weight flexibility becomes a problem needs to be solved by the UAV shipping industry.

Advantageously, the present invention meets the challenge, and provides a solution to overcome the endurance problem.

SUMMARY OF THE INVENTION

One aspect of the present invention provides a container comprising a cargo compartment, a battery, and a power outlet. The battery can provide electrical power through the power outlet to a vehicle located outside the container. The vehicle may be used to transport the container from one place to another.

Another aspect of the invention provides a transportation system comprising a container and an Unmanned Aerial Vehicle (UAV). The container comprises a cargo compartment, a battery, and a power outlet. The battery can provide electrical power through the power outlet to the UAV, and the UAV can transport the container from one place to another.

Still another aspect of the invention provides a method of delivering a product. The method includes: (1) providing a container that comprises a cargo compartment, a battery, and a power outlet at the point of departure such as a warehouse; (2) placing the product in the cargo compartment; (3) providing an Unmanned Aerial Vehicle (UAV); (4) connecting the container and UAV both electrically and mechanically; By connecting electrically, the battery can thus provide electrical power through the power outlet to the UAV; By connecting mechanically, UAV can carry the container around; (5) transporting the container from the point of departure to the destination such as customer's house using the UAV; (6) disconnecting the container and the UAV electrically and mechanically; and (7) flying the UAV away from the destination and leaving the container and the product therein in the destination.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

Figure 1A:
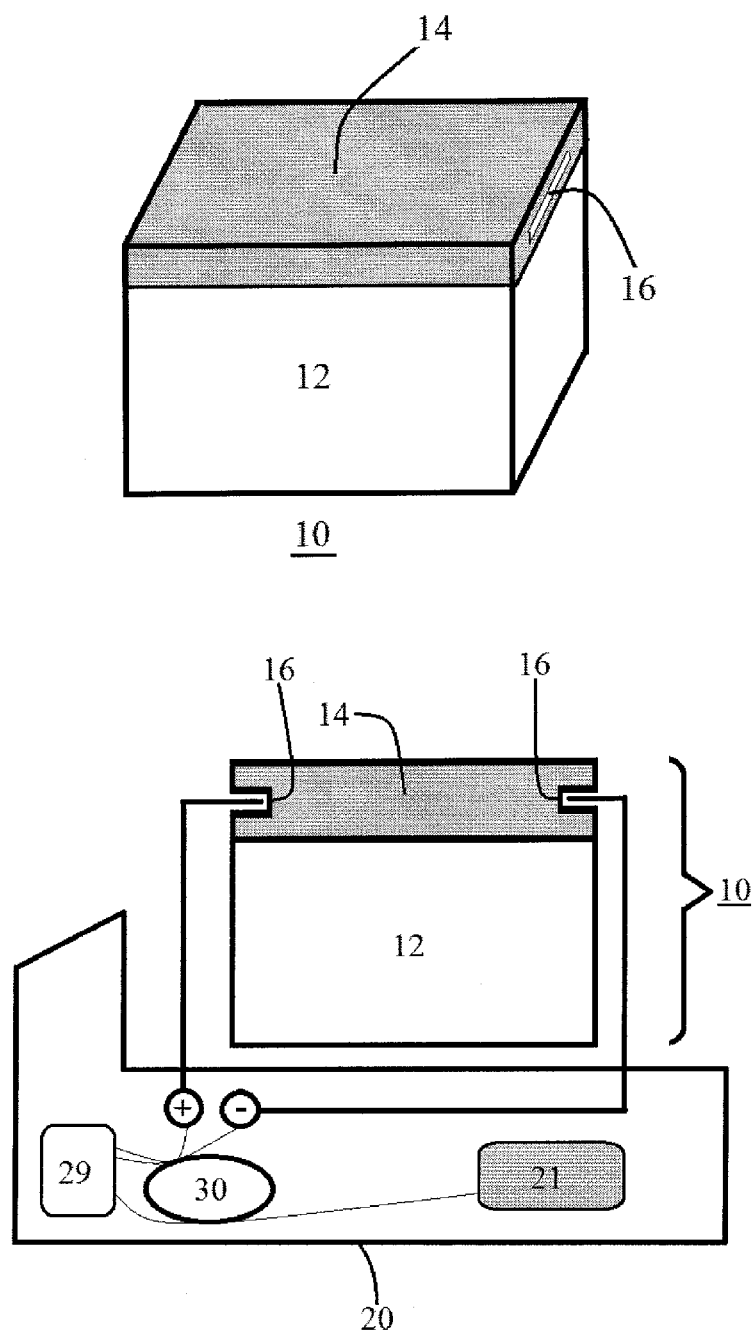
FIG. 1A shows a container comprising a battery that can provide electrical power to a shipping vehicle in accordance with an exemplary embodiment of the present invention.

FIG. 1A illustrates a container 10 according to an embodiment. Container 10 includes a cargo compartment 12, a battery 14, and a power outlet 16. Battery 14 can provide electrical power through the power outlet 16 to a vehicle 20 located outside the container 10. Vehicle 20 can be any vehicle that transports the container 10 from one place to another. The phrase "transport the container 10 from one place to another" includes (1) to load container 10 at one place, (2) to move container 10 from said one place to another place, and (3) to unload container 10 at said another place. Examples of vehicle 20 include, but are not limited to, an aircraft, a spacecraft, a watercraft including sub-surface watercraft, and a land vehicle e.g. an electrical car or truck.

Figure 1B:
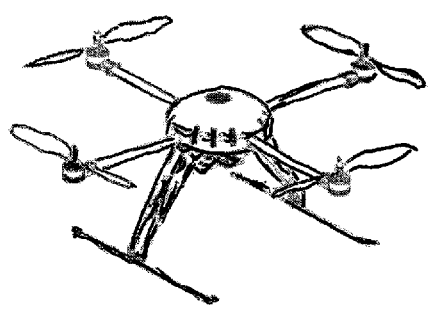
FIG. 1B shows a few examples of shipping vehicle in accordance with an exemplary embodiment of the present invention.

FIG. 1B shows a few representative examples of vehicle 20, one of which may be a rotary-wing aircraft 20a with wings (propellers) mounted on a spinning rotor shaft. Vehicle 20 can also be a fixed-wing aircraft 20b, which generates lift by the vehicle's forward airspeed and the shape of the wings.

There is no specific limitation on the size, amount, configuration, shape, position, orientation, chargeability (rechargeable or not), rigidity (flexible or rigid) and energy density of the battery. Examples of battery 14 include, but are not limited to, lithium batteries, supercapacitor, gel battery, nickel hydrogen batteries, nickel cadmium batteries, fuel cells, zinc batteries, photovoltaic batteries, and liquid battery. The battery 14 can be primary or secondary batteries. In preferred embodiments, the battery is solid state lithium battery and semi-solid lithium battery with the high energy density and good safety performance. The battery may consist of a single cell or a combination of a plurality of battery packs. The DC output voltage of the battery is preferably in the range of from 1.5 V to 36 V. The wiring between batteries and between battery and power outlet within container 10 can be implemented using any known methods and designs in the field of electrical engineering.

Figure 2:
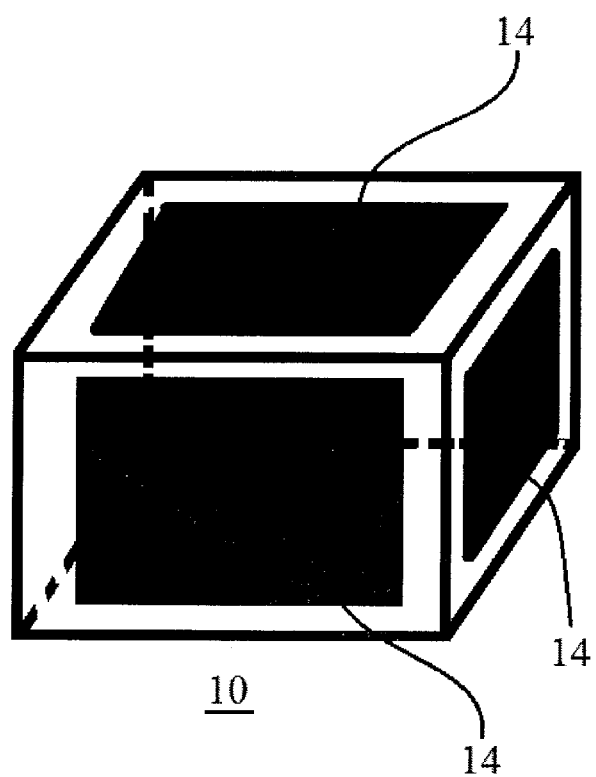
FIG. 2 illustrates a design of the battery-containing container in accordance with an exemplary embodiment of the present invention.
Figure 3:
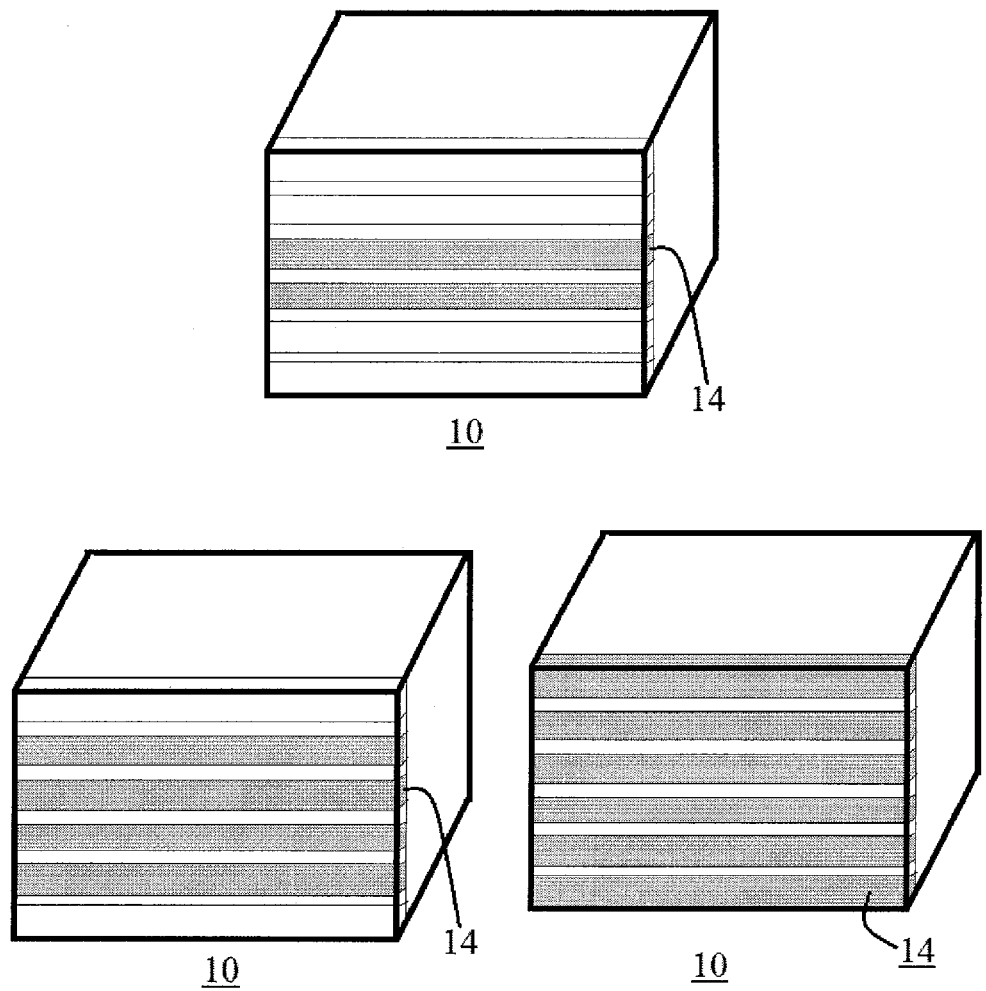
FIG. 3 illustrates another design of the battery-containing container in accordance with an exemplary embodiment of the present invention.

Any quantity of battery 14 in any shape can be placed in any suitable location within the container 10. FIGS. 2-4 and 5A-5E illustrate a few exemplary battery designs. As shown in FIG. 2, the container 10 may have a box shape, and one or more walls of the box may be hollow. The battery may be mounted or embedded within the housing wall of the container, and the battery becomes a part of the housing wall. Preferred batteries 14 are those similar to the flat battery used in cell phones. Depending on different applications, 1, 2, 3, 4, 5 or 6 of the walls or shells may be used to accommodate the battery or batteries 14. As shown in FIG. 3, an array of slimmer batteries 14 may be embedded within each wall, and the number of the slimmer batteries in the array may be adjusted according to different power needs.

Figure 4:
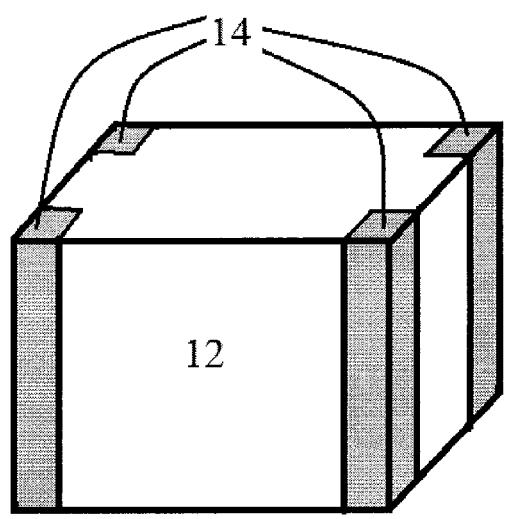
FIG. 4 illustrates still another design of the battery-containing container in accordance with an exemplary embodiment of the present invention.

As shown in FIG. 4, a box-shaped container 10 has 12 edges. One or more batteries having the shape of a rectangular, square or round column may be placed along one or more edges. In FIG. 4, four column-shaped batteries are placed along four vertical edges. However, it should be understood that 1~12of such column-shaped batteries may be placed along 1~12edges of the container 10.

Figure 5A:
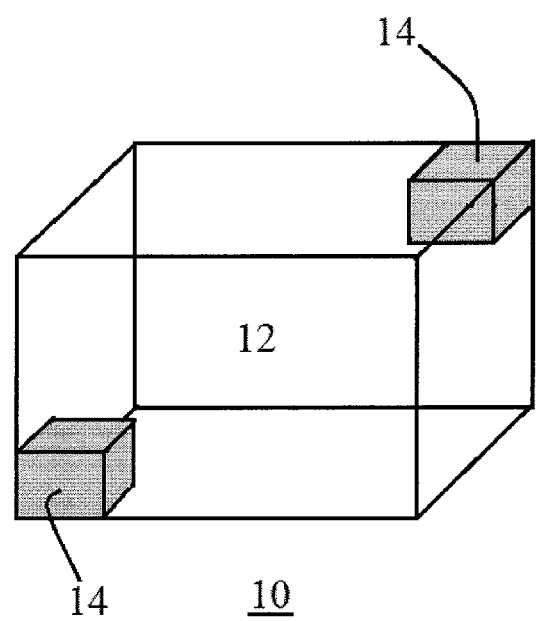
FIG. 5A illustrates still another design of the battery-containing container in accordance with an exemplary embodiment of the present invention.

In another design as shown in FIG. 5A, a box-shaped container 10 has 8 corners or vertexes. One or more batteries having the shape of a cubic or rectangular body may be arranged at the corners of the box. In FIG. 5A, two batteries 14 are placed in two corners in a diagonal relationship. However, it should be appreciated that 1-8 batteries may be placed in 1-8 corners of the container 10.

Figure 5B:
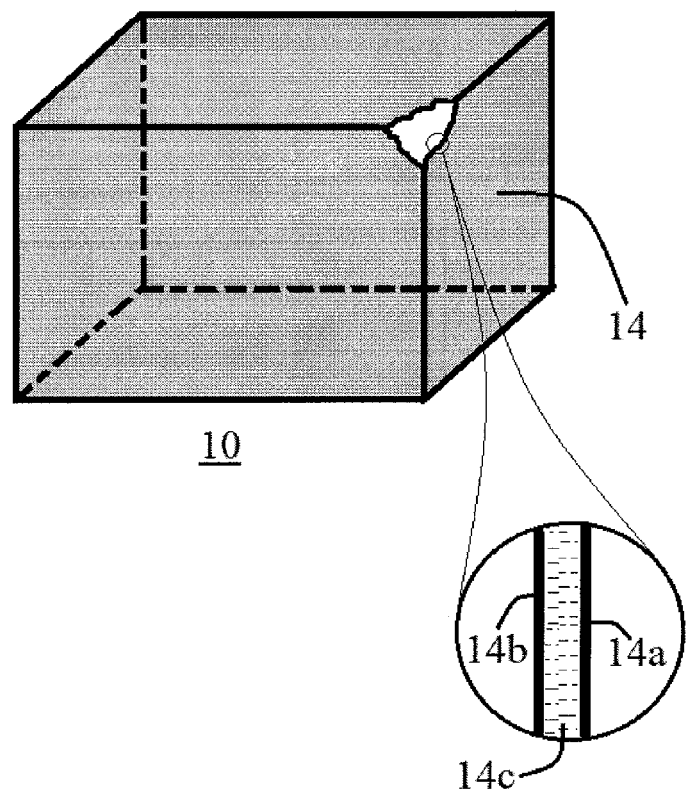
FIG. 5B depicts a design of the battery-containing container wherein the wall of the container per se is a battery in accordance with an exemplary embodiment of the present invention.
Figure 5C:
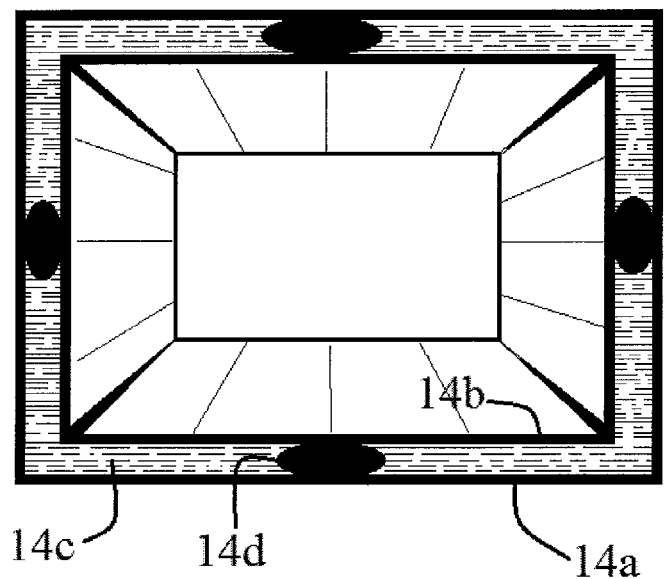
FIG. 5C shows another design of the battery-containing container wherein the walls of the container per se are a battery in accordance with an exemplary embodiment of the present invention.

In FIG. 5B, container 10 has a shape of regular box with 6 walls, and one or more of the walls per se may be constructed as a battery or batteries 14. As shown in FIG. 5B, the right wall of container 10 consists of an anode 14a, a cathode 14b, and an electrolyte 14c is sealed between the two electrodes 14a and 14b. Anode 14a is a negative electrode at which electrons leave the cell and oxidation occurs, and cathode 14b is a positive electrode at which electrons enter the cell and reduction occurs. A stack of cells is also within the scope of the present invention, and a bipolar electrode can function as the anode of one cell and the cathode of another cell. For a secondary or rechargeable battery 14, when the battery is being charged, the anode 14a becomes the positive electrode and the cathode 14b becomes the negative electrode. Electrolyte 14c may be in the form of liquid, gel, paste or solid. Gel electrolytes are liquids in a flexible lattice framework. Paste electrolyte is used for dry cells such as zinc-carbon battery. Examples of solid electrolyte include dry polymer electrolytes, solid ceramic electrolytes, and ionic plastic crystals. FIG. 5C shows that four walls (upper, bottom, right and left) of container 10 are constructed as a battery 14. The external surface of the four walls can be anode 14a, and the internal surface of the four walls becomes a cathode 14b. Similar to FIG. 5B, an electrolyte 14c is sealed between the two electrodes 14a and 14b. In preferred embodiments, electrical insulators 14d are used to separate electrodes 14a and 14b to prevent shortcut and also to give the container stronger mechanical strength.

Figure 5D:
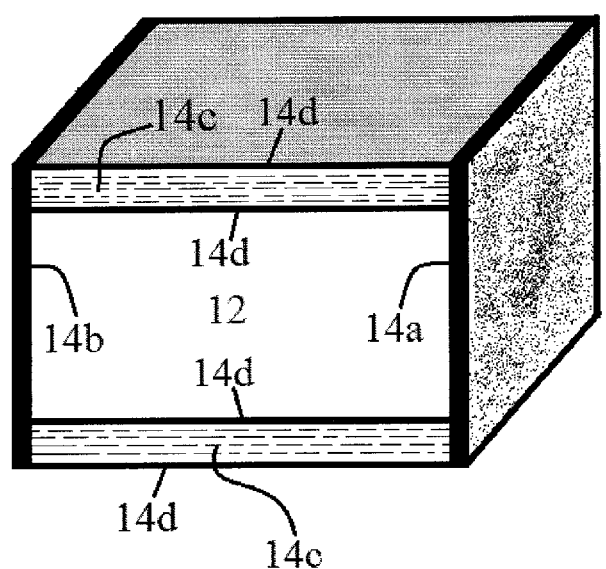
FIG. 5D demonstrates a design of the battery-containing container wherein some walls of the container per se are electrodes and other walls are filled with electrolytes in accordance with an exemplary embodiment of the present invention.

In FIG. 5D, container 10 has a shape of regular box with 6 walls, and some of the walls per se may be constructed as electrodes, and other walls can be built as electrolyte chambers. At least two walls of the container are electrodes and at least one wall is internally filled with electrolyte; and the electrodes and the electrolyte collectively function as a battery. An example is shown in FIG. 5D. The right wall of container 10 is anode 14a, and the left wall is cathode 14b. The upper wall and the bottom wall are electrical insulators 14d and can be internally filled with electrolyte 14c, which is in contact with electrodes 14a and 14b to perform a battery function.

Figure 5E:
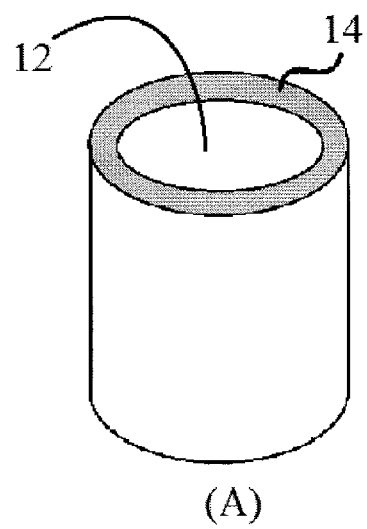
FIG. 5E illustrates some irregular shapes of the battery-containing container in accordance with an exemplary embodiment of the present invention.
Figure 5E:
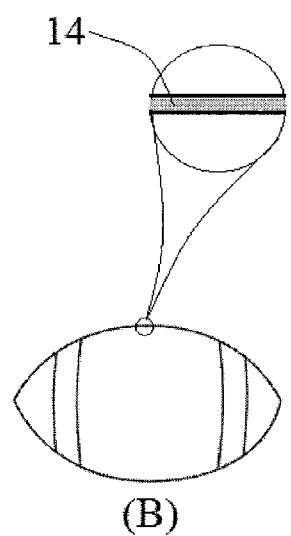

Although the figures show that container 10 has a shape of regular box, it is contemplated that the container may have other none-box shapes such as a bag, a basket, a cylinder, a regular ball, and a football etc. As shown in FIG. 5E, the container may be of a cylinder shape (upper panel A), and the wall or shell of the container may be hollow. Battery 14 may be mounted or embedded within the wall of the container. In an embodiment, such a cylinder-shaped container may also function as the standing bar of an UAV. In another embodiment, the container may have a shape with streamline curvature, such as a football shape (lower panel B, FIG. 5E), and the wall or skin or shell of the "football" may be hollow. Battery 14 may be mounted or embedded within the skin/shell of the "football" container. When such a football-shaped container is carried by fixed-wing aircraft 20b as shown in FIG. 1B, the drag can be reduced. In preferred embodiments, the container is made of lightweight materials, such as wood, paper, fabric, plastics, fibrous material, porous material, composites materials, alloy, and metals.

Figure 1B:
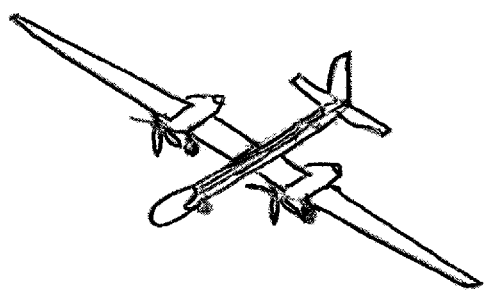

Referring back to FIG. 1, the vehicle 20 typically comprises a separate power source 21 for operating the vehicle, and the battery 14 functions as a supplemental power source to source 21 for vehicle operation. Vehicle 20 includes a driving mechanism 29 such as an electrical motor or an engine. The phrase "operating the vehicle" or "vehicle operation" is intended to include energizing the driving mechanism 29 in order to generate driving force for the physical movement of the vehicle 20. It may also include energizing less energy-consuming devices such as sensors, starter, radio, and lamp etc. A controller 30 may be used in vehicle 20 to perform power management on, and coordination between, the battery 14 and the vehicle power source 21, in energizing the driving mechanism 29.

When the battery 14 is a rechargeable cell or battery pack, container 10 preferably includes a battery management system (BMS) that protects the battery from operating outside its safe operating area, monitors its state, and calculates secondary data, reports that data, controls its environment, authenticates it, and balances it. For example, a BMS may monitor the state of the battery 14 including voltage such as total voltage, voltages of individual cells, minimum and maximum cell voltage or voltage of periodic taps; temperature such as average temperature, coolant intake temperature, coolant output temperature, and temperatures of individual cells; state of charge (SOC) or depth of discharge (DOD) to indicate the charge level of the battery; state of health (SOH) indicating the overall condition of the battery; coolant flow if battery 14 is cooled by air or fluid; as well as current in or out of the battery.

In various embodiments, controller 30 and BMS for battery 14 work together in a coordinated manner. If power source 21 is also a battery, then the three (i.e. controller 30, BMS for battery 14 and BMS for power source 21) can work together in a coordinated manner. For example, in a trip of transporting the container 10 from one place to another, controller 30 can execute a power management program, so that driving mechanism 29 consumes the power of the battery 14 in the first place and consumes as much as possible (e.g. until the battery power is substantially depleted or until the container 10 is unloaded at a shipment destination), and then driving mechanism 29 starts to consume the power of the vehicle power source 21.

Another aspect of the invention provides a transportation system comprising a container 10 and a vehicle 20. The vehicle is located outside the container 10 and can transport the container from one place to another. As described above, container 10 generally includes a cargo compartment 12, a battery 14, and a power outlet 16. The battery can provide electrical power through the power outlet to vehicle 20. In the following, a transportation system comprising a container and an Unmanned Aerial Vehicle will be used as a representative example, and will be described in more details.

Figure 6:
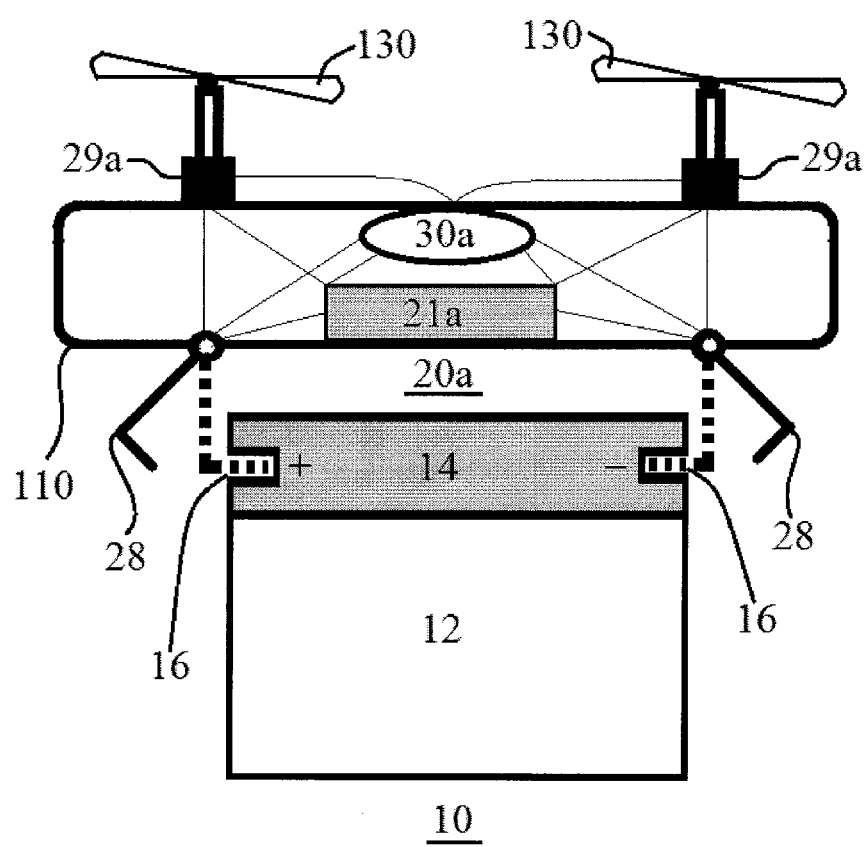
FIG. 6 schematically illustrates a transportation system including a container and an Unmanned Aerial Vehicle (UAV) in accordance with an exemplary embodiment of the present invention.

With reference to FIG. 6, a transportation system includes a container 10 and an Unmanned Aerial Vehicle (UAV) 20a, commonly known as a drone. Although UAV 20a in FIG. 6 is illustrated as a quadrotor (quadcopter) or an octorotor, it is contemplated that the present invention is not limited to quadcopter. UAV 20a can be any powered aerial vehicle (e.g. fixed-wing aircraft) without a human pilot aboard. UAV 20a of the invention can be expendable or recoverable, preferably recoverable. In general, UAV 20a uses aerodynamic forces to provide vehicle lift, and can fly autonomously or be piloted remotely. In preferred embodiments, UAV 20a is a rotorcraft that uses lift generated by rotor blade(s) or propeller(s) 130 revolving around a mast or masts.

The basic structural unit of UAV 20a is frame 110. Similar to the fuselage of an aircraft, the hull of a watercraft, the chassis of a car, or the skeleton of an organism, frame 110 gives UAV 20a its shape and strength and is sufficiently strong without undue deflection or distortion. Frame 110 functions as the main body section that supports and holds all other parts of UAV 20a. Examples of these UAV parts are a flight controller, an actuator, a remote control, a GPS device, an accelerometer (IMU), a sensor, a video camera, a digital electronic speed controller (to control e.g. the RPM of a motor), a LED, a speaker, a still camera, and a transceiver etc. An onboard computer may also equipped to operate with UAV 20a autonomously, fully or intermittently. These UAV parts can be directly or indirectly secured or affixed within/to/onto/into frame 110. UAV 20a may include one or more landing bar(s) or stand bar(s) (not shown) of any suitable shape and dimension, as part of frame 110, or as an extension structure from frame 110.

Container 10 comprises a cargo compartment 12, a battery 14, and a power outlet 16. The battery 14 can provide electrical power through the power outlet 16 to UAV 20a which is located outside the container 10, for example, above container 10 as shown in FIG. 6. UAV 20a can transport the container 10 from one place to another, that is, UAV 20a can load or pick up container 10 at one place such as a warehouse, carry and fly container 10 from the warehouse to another place such as a customer's front yard, and unload or drop container 10 at the front yard.

UAV 20a typically includes its own power source 21a for operating UAV 20a, and the battery 14 functions as a power source supplemental to source 21a. The driving mechanism 29a of UAV 20a is designed to convert one form of energy into mechanical energy, and it may be, for example, an electric motor that converts electrical energy into mechanical motion, or a heat engine that burns a fuel to create force. Driving mechanism 29a can drive or rotate propellers 130 to provide vehicle lift and maneuverability. In preferred embodiments, battery 14, like power source 21a, can be used for energizing the driving mechanism 29a and rotating propellers 130 so as to generate driving force in flying UAV 20a.

Similar to what described above, controller 30a and BMS for battery 14 work together in a coordinated manner. If power source 21a is also a battery, then controller 30a, BMS for battery 14 and BMS for power source 21a can work together in a coordinated manner. For example, in a trip of transporting the container 10 from one place to another, controller 30a can execute a power management program, so that driving mechanism 29a consumes the power of the battery 14 in the first place and consumes as much as possible (e.g. until the battery power is substantially depleted or until the container 10 is unloaded at a shipment destination), and then driving mechanism 29a starts to consume the power of the vehicle power source 21a.

On one hand, the container 10 is electrically connectable to UAV 20a, and, when the two are so connected, the battery 14 can therefore provide electrical power through the power outlet 16 to UAV 20a. On the other hand, the container 10 is mechanically connectable to UAV 20a, when the two are so connected, UAV 20a can therefore function as a carrier to carry the container 10 around, meeting the minimum shipping requirements. The electrical connectivity and the mechanical connectivity may be accomplished using two separately designed structures, in preferred embodiments, they are accomplished with a single structure, or a bifunctional structure. In various embodiments, the electrical connection can be accomplished using at least one electrical structure, the mechanical connection can be accomplished using at least one mechanical structure, and the electrical structure and the mechanical structure are separated from each other. In other embodiments, the electrical connection and the mechanical connection can be accomplished using at least one electrically-and-mechanically bifunctional structure. For example, a flexible conductor or cable with sufficient mechanical strength can be used to connect container 10 and UAV 20a, both electrically and mechanically. The connection and disconnection may be performed manually or using a magnetic lock or other known locking devices.

Referring back to FIG. 6, an example of such a bifunctional structure is a conductive lockable holder 28, and the power outlet 16 is configured to be a receptacle for the holder. Holder 28 is electrically conductive and mechanically lockable within the power outlet, and it may be controlled by the controller 30a as well. When UAV 20a is loading the container 10, holder 28a is actuated to insert into power outlet 16 and locked thereto, and power outlet 16 is thus electrically connected to driving mechanism 29a. On the other hand, holder 28 is sufficiently robust that it can grab and hold tightly the container for the purpose of shipping it in air. In operation, when a flying UAV 20a carries the container 10, conductive lockable holder 28a remains inserted into power outlet 16 and remains locked thereto, and power outlet 16 remains electrically connected to driving mechanism 29a. When UAV 20a is unloading the container 10, holder 28a is removed from power outlet 16 and unlocked therefrom, and power outlet 16 is thus electrically disconnected from driving mechanism 29a.

Figure 7:
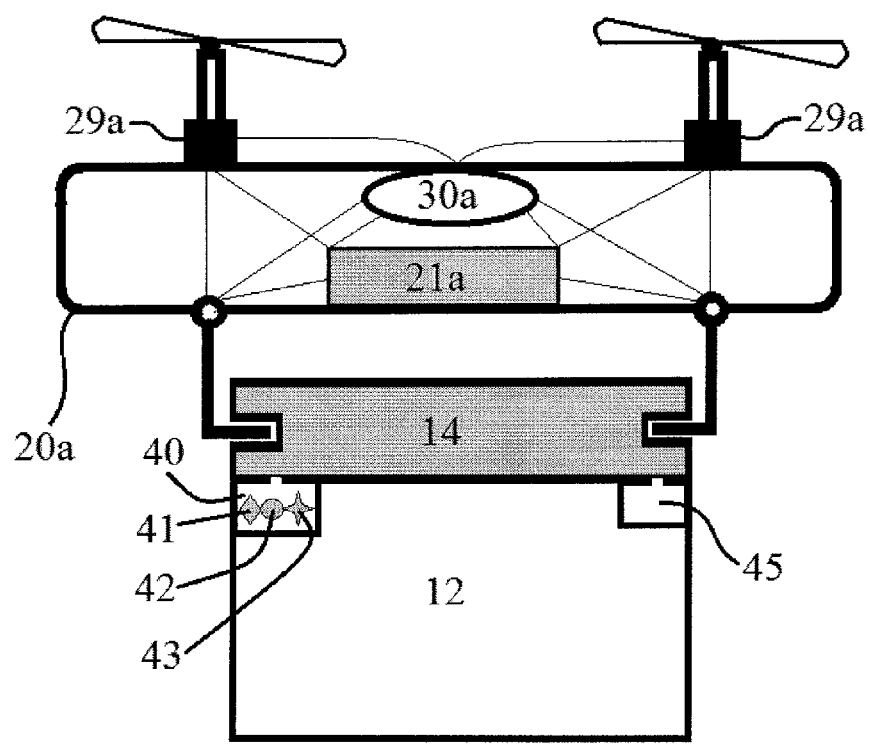
FIG. 7 schematically illustrates a transportation system including a tracking unit in the container in accordance with an exemplary embodiment of the present invention.

In a preferred embodiment as shown in FIG. 7, the container 10 further comprises a tracking unit 40 for the shipping company and shipping recipient to track, monitor, archive, and manage the transportation system. Tracking unit 40 may be a system for automatic identification and data capture (AIDC). This approach can automatically identify the container 10, collect its data, and enter that data directly into computer systems (i.e. without human involvement). AIDC technologies for container 10 include, but are not limited to, bar codes, Radio Frequency Identification (RFID), magnetic stripes, and smart cards.

In one embodiment, tracking unit 40 enables the tracking capability similar to mobile phone tracking. The signal strength of tracking unit 40 to nearby antenna masts varies depending on the distance therebetween. As tracking unit 40 changes location, the antenna towers monitor the signal, and tracking unit 40 is "roamed" to an adjacent tower. By comparing the relative signal strength from multiple antenna towers, a general location of tracking unit 40 can be determined. Other means make use of the antenna pattern, which supports angular determination and phase discrimination. A tracking precision of down to 50 meters may be achieved in urban areas where mobile traffic and density of antenna towers (base stations) is sufficiently high. For example, localization of the container 10 may be accomplished using multilateration of radio signals between cell towers of the network. In doing so, tracking unit 40 emits at least the roaming signal to contact the next nearby antenna tower, but the process does not require an active call. Mobile positioning of tracking unit 40 may include location-based services that disclose the actual coordinates of tracking unit 40. Localization of the container 10 may also be accomplished by determining the sector in which tracking unit 40 is located and roughly estimate also the distance to the base station. Further approximation can be done by interpolating signals between adjacent antenna towers.

In other embodiments, crowdsourced Wi-Fi data can be used to identify tracking unit 40's location. Wi-Fi-based indoor positioning is particularly useful in indoor environment. Tracking unit 40 can combine Global Navigation Satellite Systems (GNSS), such as GPS and GLONASS, with Wi-Fi positioning systems.

In another embodiment, tracking unit is an underwater locator beacon (ULB) or underwater acoustic beacon, similar to a "black box". For example, tracking unit 40 can emit an ultrasonic 10 ms pulse ("Pings") once per second at about 37.5 kHz. The signal can be detected by any known detectors, and then be used to calculate the positon of the container. For example, a 37.5 kHz (160.5 dB re 1 μPa) pinger can be detectable within a range of 1~5 kilometers.

In an exemplary embodiment as shown in FIG. 7, tracking unit 40 may include: (1) a GNSS receiver such as GPS receiver 41 operable to receive tracking data from satellites, (2) a microprocessor 42 connected to the GPS receiver 41 and operable to receive tracking data from the GPS receiver 41 and process the tracking data into a data packet, and (3) a transmitter 43 connected to the microprocessor 42 and operable to transmit the data packet from the microprocessor 42 to a remote receiving station. Transmitter 43 may include a cell-phone circuit having a predetermined operating wavelength.

As shown in FIG. 7, the container 10 may further comprise a recording unit 45 such as a still camera, a video camera, or an audio recorder. For example, when a person attempts to open the container 10 and take out the product therein, the recording unit 45 can be automatically trigged and turned on, and start making record of the person. The recorded image, video, and voice can be used as a confirmation that the product has been received by the recipient, or as an evidence for law enforcement that the product has been stolen by an unauthorized recipient e.g. a thief.

Figure 8:
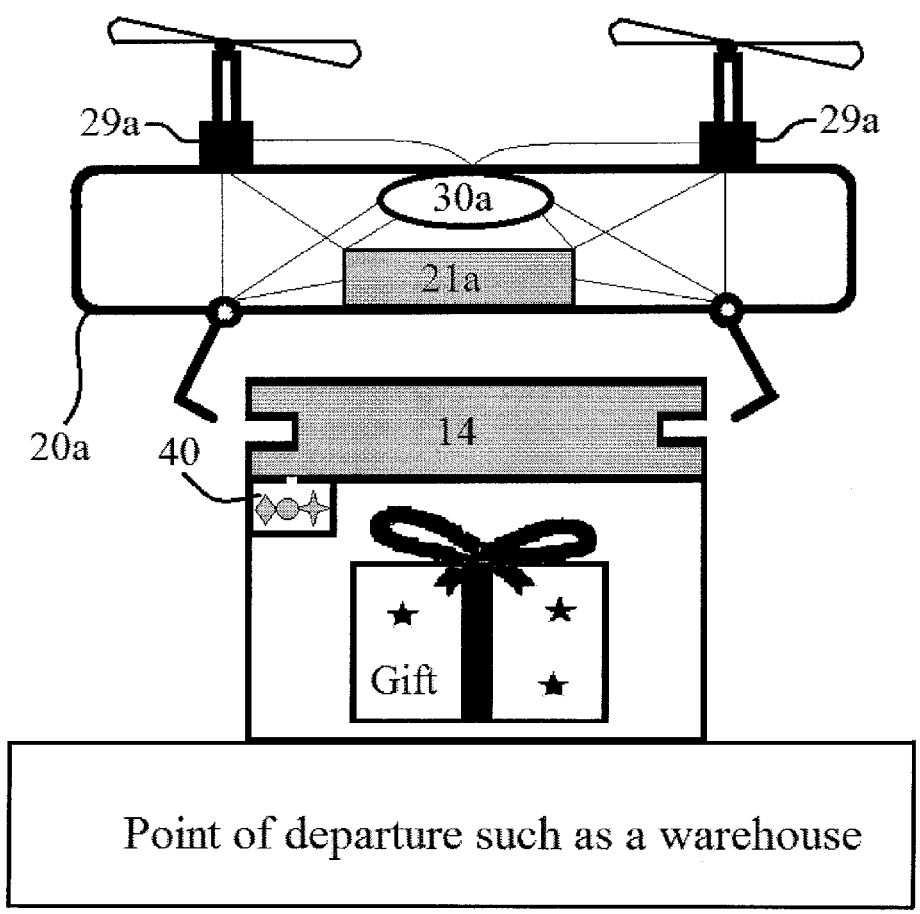
FIG. 8 shows a step of preparing the shipment of a product using the transportation system of FIG. 7 in accordance with an exemplary embodiment of the present invention.

A further aspect of the invention provides a method for delivering a product. The method includes the following steps. As illustrated in FIG. 8, at the point of departure such as a warehouse, a container 10 as described above is provided. Container 10 comprises a cargo compartment 12, a battery 14, and a power outlet 16. If battery 14 is rechargeable, it is preferably fully charged. Then a product such as a gift is placed in the cargo compartment 12. An unmanned Aerial Vehicle (UAV) 20a is also provided at the point of departure.

Figure 9:
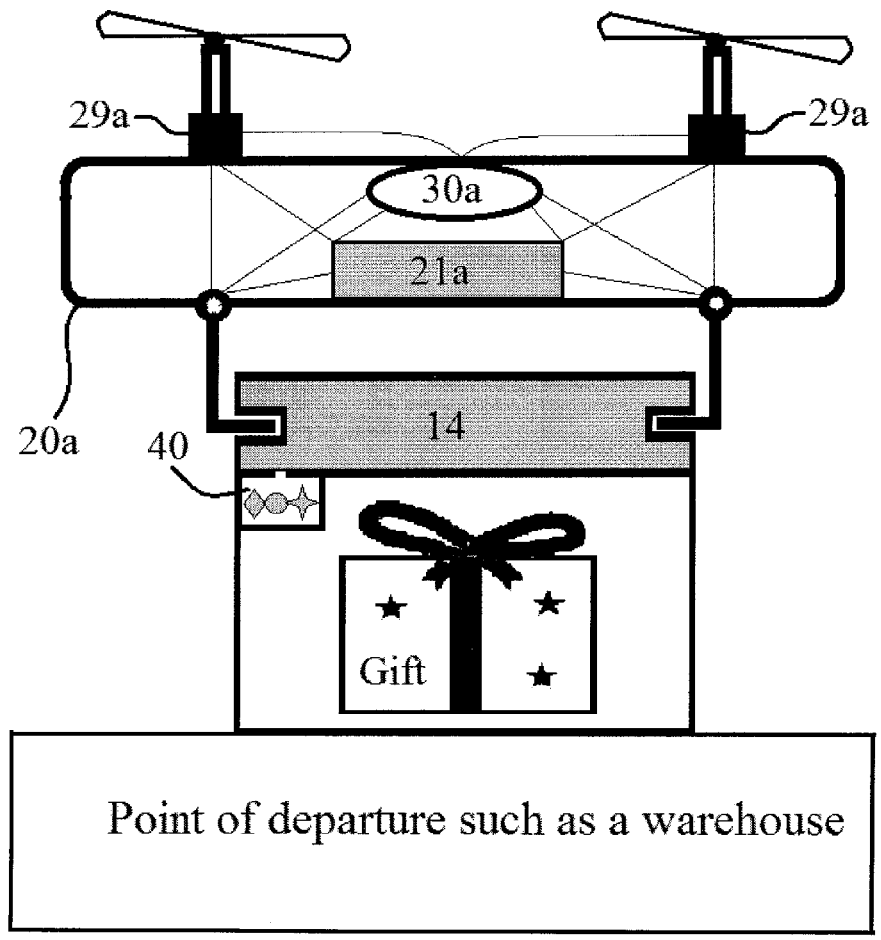
FIG. 9 illustrates a step of connecting the container and the UAV electrically and mechanically in accordance with an exemplary embodiment of the present invention.

In FIG. 9, the container 10 and UAV 20a are connected both electrically and mechanically. For example, one or more conductive lockable holder 28 as described above can be used to enable UAV 20a to load, carry and unload the container 10. As a result, the battery 14 can provide electrical power through the power outlet 16 to UAV 20a, and UAV 20a can carry the container 10 around for shipping.

Figure 10:
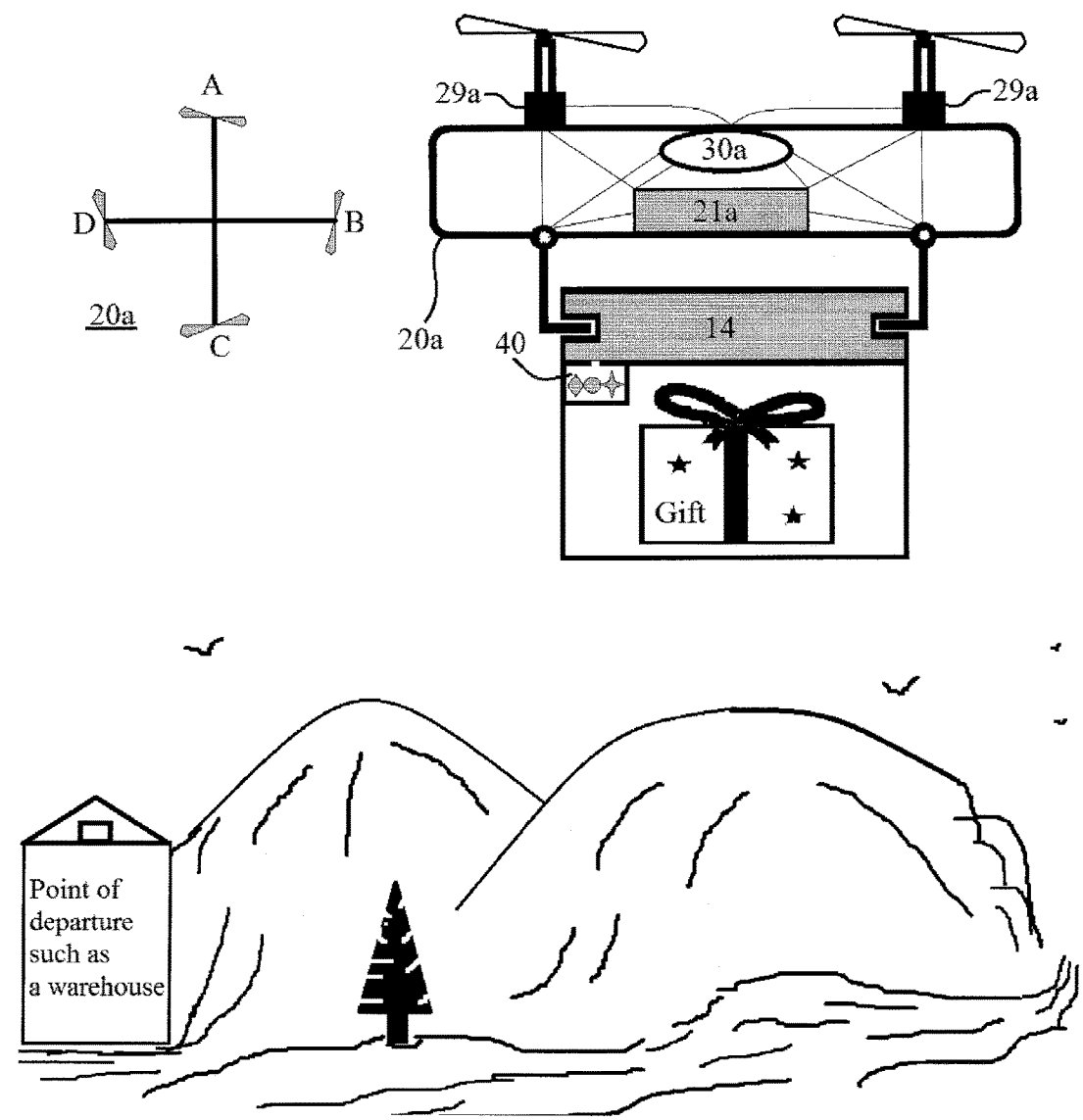
FIG. 10 depicts a step that UAV takes off and transports the container to the destination in accordance with an exemplary embodiment of the present invention.
Figure 11:
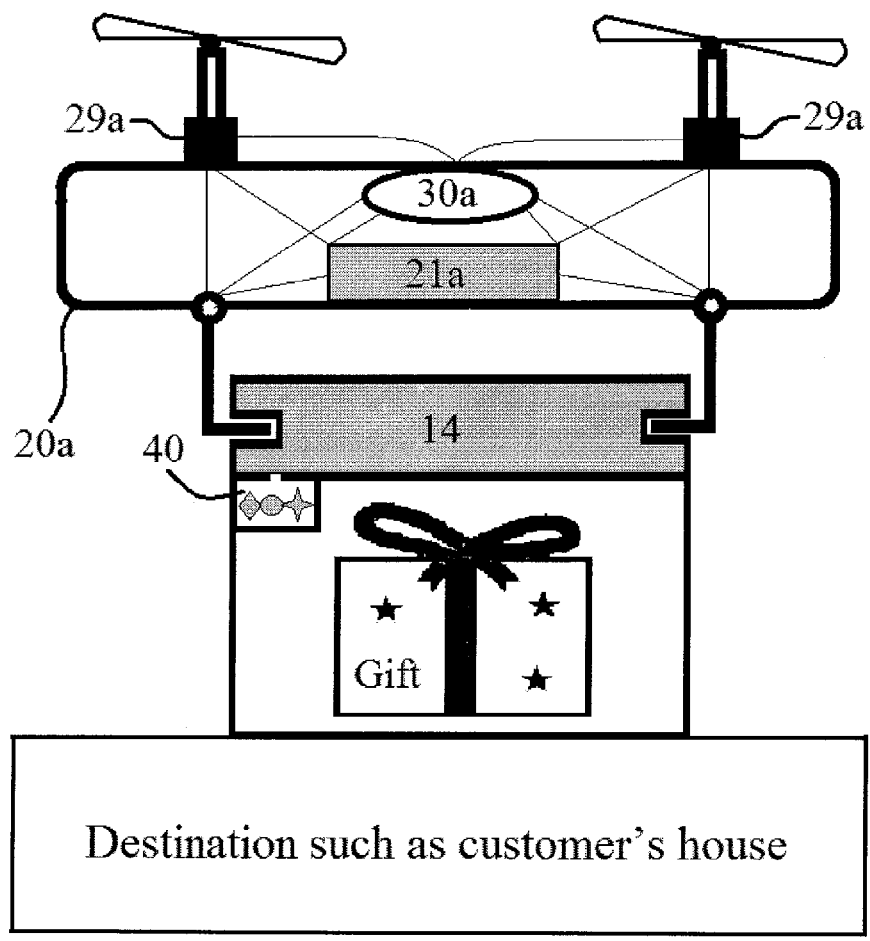
FIG. 11 shows the UAV successfully lands on the destination in accordance with an exemplary embodiment of the present invention.

As shown in FIG. 10, UAV 20a takes off and transports the container 10 from the point of departure to the destination such as customer's house. During the flight, holder 28a remains inserted into power outlet 16 and remains locked thereto to carry container 10, and power outlet 16 remains electrically connected to driving mechanism 29a through holder 28a. For UAV 20a that is a quadrotor or quadcopter, its motion control can generally be achieved by varying the relative speed of each rotor to change the thrust and torque produced by each rotor. For example, UAV 20a may generally use two pairs of identical fixed pitched propellers 130 as shown in FIG. 6, two revolving/spinning clockwise and the other two revolving/spinning counter-clockwise. As a matter of flight dynamics, independent variation of the speed of each rotor (labeled as A, B C and D in FIG. 10) can be used to achieve control of UAV 20a. By changing the speed of each rotor, it is possible to specifically generate a desired total thrust; to locate for the center of thrust both laterally and longitudinally; and to create a desired total torque or turning force. For example, each rotor A/B/C/D produces both a thrust and torque about its center of rotation, as well as a drag force opposite to UAV 20a's direction of flight. If all rotors ABCD are spinning at the same angular velocity, with rotors A and C rotating clockwise and rotors B and D counterclockwise, the net aerodynamic torque and the angular acceleration about the yaw axis are exactly zero, which enables the elimination of the tail rotor used on conventional helicopters. Yaw is induced by mismatching the balance in aerodynamic torques, i.e. by offsetting the cumulative thrust commands between the counter-rotating propeller pairs. For example, by applying equal thrust to all four rotors ABCD, UAV 20a can hover or adjust its altitude. By applying more thrust to rotors rotating in one direction (either AC or BD), UAV 20a can adjust its yaw. By applying more thrust to one rotor (e.g. A) and less thrust to its diametrically opposite rotor (e.g. C), UAV 100 can adjust its pitch or roll. The term "drag" is defined as the component of the total aerodynamic force parallel to the flow direction. The term "lift" is defined as the component of the total aerodynamic force perpendicular to flow direction of UAV 20a. In FIG. 11, UAV 20a successfully lands on the destination, such as customer's front yard.

Figure 12:
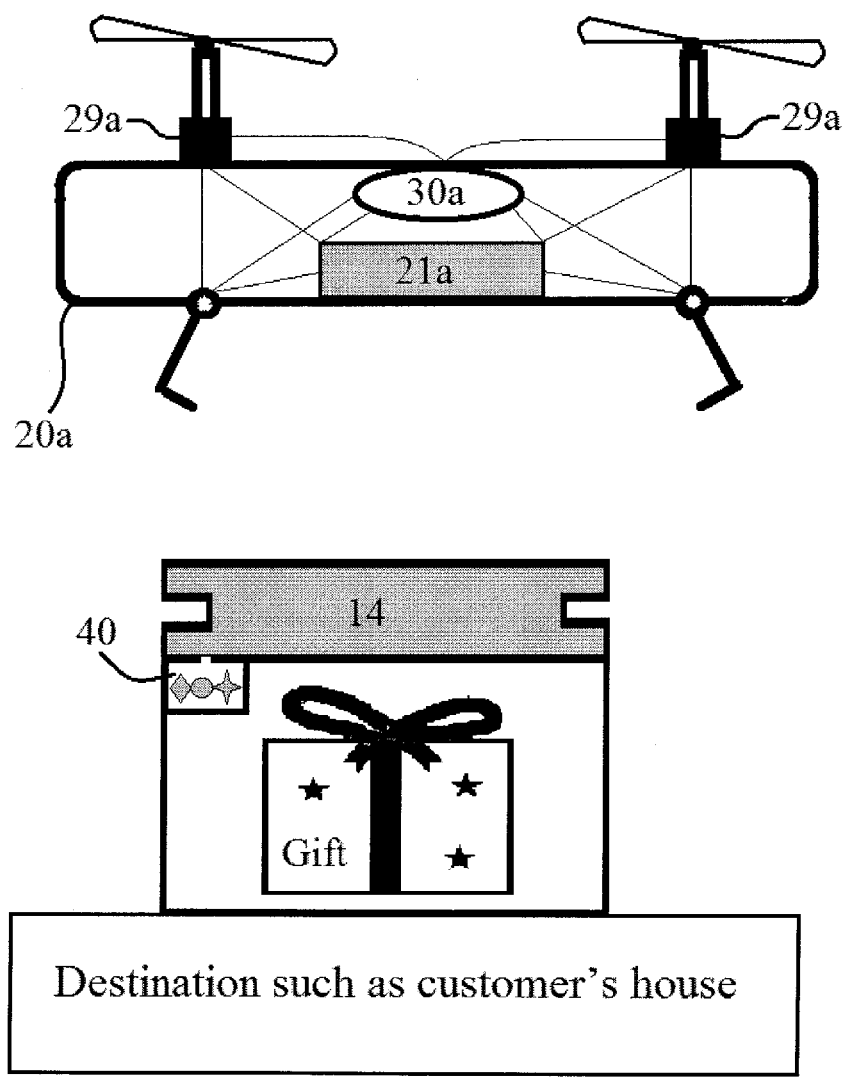
FIG. 12 demonstrates a step of unloading the container from the UAV and disconnecting the two electrically and mechanically in accordance with an exemplary embodiment of the present invention.

In FIG. 12, the container 10 and UAV 20a are disconnected electrically and mechanically. When UAV 20a is unloading the container 10, holder 28a is removed from power outlet 16 and unlocked therefrom, and power outlet 16 is electrically disconnected from driving mechanism 29a.

Figure 13:
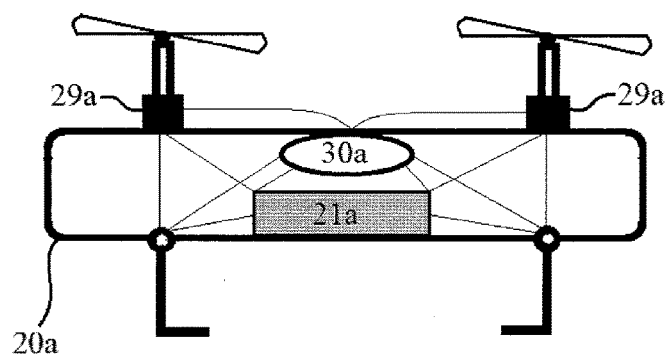
FIG. 13 illustrates that the unloaded UAV flying away from the destination in accordance with an exemplary embodiment of the present invention.
Figure 13:

As indicated in FIG. 13, UAV 20a flies away from the destination, leaving behind the container 10 and the product therein in the destination. For example, UAV 20a may fly back to the point of departure, or to a charging station for recharging. The method of the invention may further comprise a step of collecting and recycling the empty container that was left in the destination. For example, when the battery is a rechargeable battery, the empty container in the destination is collected, the battery is recharged, and the container is reused for next shipment.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A container comprising a cargo compartment, a battery, and a power outlet, wherein the battery can provide electrical power through the power outlet to a vehicle located outside the container, and said vehicle can transport the container from one place to another; and
    wherein at least two walls of the container are electrodes and at least one wall is internally filled with electrolyte; and the electrodes and the electrolyte collectively function as the battery.

2. The container according to claim 1, wherein the battery is selected from lithium batteries, supercapacitor, gel battery, nickel hydrogen batteries, nickel cadmium batteries, fuel cells, zinc batteries, photovoltaic batteries, liquid battery, as well as primary and secondary batteries.

3. The container according to claim 1, wherein the battery is mounted or embedded within the housing wall of the container, and the battery becomes a part of the housing wall.

4. The container according to claim 1, wherein a wall of the container consists of an anode, a cathode, and an electrolyte; and the wall functions a battery.

5. The container according to claim 1, wherein the container is made from lightweight materials, such as wood, paper, fabric, plastics, porous material, fibrous material, composites materials, alloy, and metals.

6. A transportation system comprising the container according to claim 1 and an Unmanned Aerial Vehicle (UAV), wherein the battery can provide electrical power through the power outlet to the UAV located outside the container, and said UAV can transport the container from one place to another.

7. The transportation system according to claim 6, wherein the UAV comprises a separate power source for operating the UAV, and the battery functions as a supplemental power source to said separate power source for operating the UAV.

8. The transportation system according to claim 7, wherein the. UAV comprises a driving mechanism, and said operating the UAV includes energizing the driving mechanism in order to generate driving force for flying the UAV.

9. The transportation system according to claim 8, wherein the container further includes a battery management system (BMS) for managing the battery therein, and the UAV further comprises a controller to perform power management on the BMS of the battery within the container, the UAV's separate power source, and driving mechanism in operating the UAV.

10. The transportation system according to claim 9, wherein, in transporting the container from one place to another, said controller can execute a power management program in which the driving mechanism consumes the power of the container's battery in the first place and as much as possible before the UAV starts to consume the power of the UAV's separate power source.

11. The transportation system according to claim 6, wherein the container is electrically connectable to the UAV, and, when the two are connected, the container's battery can provide electrical power through the power outlet to the UAV; and wherein the container is mechanically connectable to the UAV, and, when the two are connected, the UAV can carry the container around for shipping.

12. The transportation system according to claim 11, wherein said electrical connection is accomplished using at least one electrical structure, said mechanical connection is accomplished using at least one mechanical structure, and said electrical structure and said mechanical structure are separated from each other.

13. The transportation system according to claim 11, wherein said electrical connection and said mechanical connection are accomplished using at least one electrically-and-mechanically bifunctional structure.

14. The transportation system according to claim 13, wherein said electrically-and-mechanically bifunctional structure comprises a mechanically lockable holder which is electrically conductive, wherein the power outlet is configured to be a receptacle for said holder; wherein when the UAV is loading and carrying the container, said holder can be inserted into the power outlet and mechanically locked thereto, and in the meanwhile the power outlet can be electrically connected to the UAV power system, and wherein when the UAV is unloading the container, said holder is removed from the power outlet and mechanically unlocked therefrom, and the power outlet is electrically disconnected from the UAV power system.

15. The transportation system according to claim 6, wherein the container further comprises a tracking unit.

16. The transportation system according to claim 6, wherein the container further comprises a recording unit.

17. A method of delivering a product using the transportation system of claim 6, comprising:
 (1) providing a container that comprises a cargo compartment, a battery, and a power outlet at the point of departure such as a warehouse;
 (2) placing the product in the cargo compartment;
 (3) providing an Unmanned Aerial Vehicle (UAV);
 (4) connecting the container and the UAV electrically and mechanically, wherein the battery can thus provide electrical power through the power outlet to the UAV, and the UAV can thus carry the container around for shipping;
 (5) transporting the container from the point of departure to the destination such as customer's house using the UAV;
 (6) disconnecting the container and the UAV electrically and mechanically at the destination; and
 (7) flying the UAV away from the destination and leaving behind the container and the product therein at the destination.

18. The method according to claim 17, further comprising a step of collecting and recycling the empty container left in the destination.

19. The method according to claim 17, wherein the battery is a rechargeable battery, further comprising a step of collecting the empty container left in the destination, recharging the battery, and reusing the container for next shipment.

* * * * *